US006892431B2

(12) United States Patent
Campbell et al.

(10) Patent No.: US 6,892,431 B2
(45) Date of Patent: May 17, 2005

(54) HAND HELD SPIN-PULL TOOL FOR INSTALLING THREADED INSERTS AND METHOD FOR USING SAME

(75) Inventors: Frederick A. Campbell, Webster, NY (US); James M. Thomas, Farmington, NY (US); Jeffrey S. Clough, Rush, NY (US); Jesse J. Diehl, Spencerport, NY (US)

(73) Assignee: Meikle NY, Inc., Rochester, NY (US)

( * ) Notice: Subject to any disclaimer, the term of this patent is extended or adjusted under 35 U.S.C. 154(b) by 334 days.

(21) Appl. No.: 10/314,585

(22) Filed: Dec. 9, 2002

(65) Prior Publication Data

US 2003/0150093 A1 Aug. 14, 2003

Related U.S. Application Data

(63) Continuation-in-part of application No. 09/707,113, filed on Nov. 6, 2000, now Pat. No. 6,490,905, and a continuation-in-part of application No. 10/256,530, filed on Sep. 27, 2002, now Pat. No. 6,735,843.

(51) Int. Cl.[7] .................................................. B23P 17/00
(52) U.S. Cl. ................. 29/407.08; 29/714; 29/243.526; 29/525.11; 29/243.53; 72/391.8; 72/453.17
(58) Field of Search ......................... 29/525.11, 402.12, 29/402.14, 402.15, 428, 505, 509, 525, 524.1, 700, 712, 798, 243.53, 243.526, 407.08, 714; 72/391.8, 453.17; 228/114.5; 227/77, 110

(56) References Cited

U.S. PATENT DOCUMENTS

| | | | | |
|---|---|---|---|---|
| 4,589,155 A | | 5/1986 | Jeal | |
| 4,699,552 A | | 10/1987 | Jeal | |
| 4,821,555 A | * | 4/1989 | Kamata et al. ............ | 72/391.8 |

(Continued)

FOREIGN PATENT DOCUMENTS

| | | |
|---|---|---|
| CA | 2012152 | 9/1990 |
| CA | 2144394 | 9/1995 |
| CA | 2168197 | 8/1996 |
| EP | 0 388 117 | 9/1990 |
| EP | 0 674 109 | 9/1995 |
| EP | 0 725 221 | 8/1996 |
| GB | 2112893 | 7/1983 |
| GB | 2299639 | 10/1996 |
| GB | 2326908 | 1/1999 |

*Primary Examiner*—David P. Bryant
*Assistant Examiner*—Stephen Kenny
(74) *Attorney, Agent, or Firm*—Michael L. Dunn

(57) ABSTRACT

A hand held spin-pull tool for securing a hollow threaded insert into a substrate. The hand held tool of the invention has at least the following components: a) a switch activated (closed) by manual movement; b) a rotatable drive activatable in response to the closed switch where the rotatable drive has an attached drive shaft in turn having an attached threaded mandrel so that upon activation the mandrel rotates so that threads of the mandrel mate with the threads of the insert; c) a nose retainer position detector for detecting when the nose retainer reaches the flange of the insert; d) a controller for stopping the rotation in response to detecting when the nose retainer reaches the flange of the insert; e) a cylinder and piston where the piston has a central bore retaining the drive shaft that passes through the bore; f) a slide coupling connecting the drive shaft with the drive; g) a hydraulic system for applying pressure to the piston to move the piston, drive shaft and attached mandrel to collapse the intermediate portion of the insert to grip the second surface of the substrate; h) a controller for activating and controlling the hydraulic system for applying pressure to the piston in response to detecting when the nose retainer reaches the flange of the insert; i) an insert collapse detector for detecting when the intermediate portion has collapsed to grip the second surface of the substrate; and j) a controller for disengaging the hydraulic system and for turning the drive in a reverse direction to disengage the mandrel from the threads of the insert. The invention includes a method using the tool of the invention for installing an insert.

23 Claims, 8 Drawing Sheets

U.S. PATENT DOCUMENTS

| | | | | | |
|---|---|---|---|---|---|
| 5,315,744 | A | * | 5/1994 | Denham et al. | 29/243.53 |
| 5,666,710 | A | * | 9/1997 | Weber et al. | 29/243.523 |
| 5,875,664 | A | * | 3/1999 | Scott et al. | 72/16.1 |
| 6,067,839 | A | * | 5/2000 | Xie | 72/391.8 |
| 6,212,931 | B1 | * | 4/2001 | Solfronk | 72/391.8 |
| 6,272,899 | B1 | * | 8/2001 | Bentivogli | 72/391.8 |

* cited by examiner

HAND HELD SPIN-PULL TOOL FOR INSTALLING THREADED INSERTS AND METHOD FOR USING SAME

This is a Continuation-in-Part of U.S. Ser. No. 09/707,113 filed Nov. 6, 2000 now U.S Pat. No. 6,490,905 and a Continuation-in-Part of U.S. Ser. No. 10/256,530 filed Sep. 27, 2002 now U.S. Pat No. 6,735,843.

BACKGROUND OF THE INVENTION

This invention relates to methods and apparatus for installing threaded inserts into a substrate. Such substrates, for example, include films, sheets or plates that may be curved or flat. The substrates may be made of materials such as metal, wood, glass, ceramic, cellulose, leather or plastic and may be completely solid, or partly porous, e.g. in the form of textiles of foam. More particularly, the invention concerns an insert that has a hollow shaft having first and second end portions and an intermediate portion between the end portions and a flange surrounding the first end portion. The insert is installed by passing the intermediate portion and second end portion into or through a hole in the substrate to preferably, but not essentially, pass through a rear surface of the substrate so that the flange of the insert contacts a front surface of the substrate. The second end portion is then pulled toward the first end portion to collapse the intermediate portion of the shaft upon the rear surface of the substrate (or upon the sidewalls defining the hole in the substrate) to form a gripping structure that secures the insert.

Inserts, as described above, are well known. They are for example readily purchased at local hardware stores for insertion into drywall substrates. Such inserts have more recently been used in production processes to provide threaded structures in substrates that may not be strong enough by themselves to support reliable threads or to reduce production time by eliminating the need to thread individual holes in the substrates with taps.

The use in production has, however been hampered by the lack of processes and equipment to rapidly and reliably install such inserts.

The first, and still most common, way to install such inserts is by placing the shaft through a hole in the substrate, as above described, and turning a threaded rod with an end flange, e.g. a bolt having a bolt head or flanged threaded mandrel or screw head, into the threads in the second end of the insert thus pulling the second end toward the first end of the insert to collapse the intermediate portion of the insert, as previously described.

Such a method of installation has numerous disadvantages. For example, when the threaded rod with its end flange is turned to collapse the intermediate portion, significant torque is required. The high torque tends to turn the entire insert which can result in a bad installation by causing the formation of a defective gripping structure, or destroying or damaging the substrate or even more commonly, causing failure of threads within the insert. Great care must therefore be taken to assure that the insert does not spin. This often requires that a separate insert retaining means be employed that can withstand the required high torque. Even in such cases, the failure to obtain a good installation is more frequent than can be tolerated by many, if not most, production systems.

More recently, such inserts have been installed in production systems by threading a mandrel into the insert and longitudinally pulling the second end of the shaft of the insert toward the first end of the shaft of the insert, without applying a rotational torque. Nevertheless, the apparatus and processes for accomplishing that result have not been as reliable as desired. In particular, in existing apparatus, when the mandrel was pulled, it was necessary to move the entire drive assembly with the mandrel thus preventing secure attachment of the drive to a cylinder housing for the piston providing the pulling force. As a result, the drive (motor) tended to at least partially move rotationally when it was activated creating wear and misalignment and preventing smooth rotational operation. Further when the drive was activated to rotate the drive shaft, due to wear, as previously described, unacceptably high friction resulted between the drive shaft and piston through which the shaft passed, wearing both the drive shaft and the race or bore through the piston accommodating the drive shaft. As a further result, the turning of the drive shaft tended to also rotate the piston creating wear in the piston seals. The same increase in friction caused an increase in torque requirements to overcome friction losses. This is especially troublesome in a hand held tool.

All of these problems resulted in significant down time and potentially unsatisfactory installation of the insert. As an even further disadvantage of such apparatus and methods, there was no good way to detect when the screw head (e.g. threaded mandrel) was withdrawn to permit positioning of an insert for loading onto the screw head. There was also no good way to detect where the screw head was screwed into the insert so that the nose retainer contacted the flange of the insert or where the shaft of the insert was inserted into the substrate so that the insert flange contacted the first surface of the substrate or where the screw head had been completely unscrewed from the insert. Accurate use of detectors would have been hampered in such devices due to motion of the drive relative to the cylinder housing and also due to lack of a secure attachment of the drive, the tendency of the piston to rotate and undesirable wear, as previously described. Attempts to stop the piston from rotating themselves give a further wear point as the misalignments due to the insecurely attached drive permit rotational forces to be applied to the piston to be at least partly successful in causing piston rotation due to wear as previously described. The devices further did not lend themselves to safe placement of detectors, i.e. there was no good way for internal detecting mechanisms and the required undesirable movements previously described caused vibration of any sensors used.

Hand held tools for securing inserts, as previously described had numerous additional problems. In particular, forward rotation of a threaded mandrel to properly load the insert into the tool was begun and stopped by a trigger switch subject only to judgment control of the operator. This sometimes resulted in incomplete or too tight initial threading of the insert onto the tool. Incomplete seating resulted in subsequent pulling upon an incompletely seated insert with possible damage to the insert flange or possible collapsing of the insert at undesirable locations. Initial seating that was too tight could cause premature collapsing of the insert due to drawing the threads toward the tool upon excess continued rotation.

Similarly, after the insert was initially threaded with the mandrel of the tool, initiation of the action to draw the second end portion to collapse the intermediate portion of the insert against the second surface of the substrate to secure the insert was again a judgment call by the operator. If the drawing action was begun too soon, i.e. before proper seating on the tool, collapsing of the insert could again occur at an improper location on the insert. Further, even if the insert were properly seated on the tool, the operator could inadvertently move the tool and seated insert away from the hole before initiating the pulling action thus collapsing the intermediate portion of the insert at an improper position relative to the hole thus again not properly securing the insert. Even more commonly, the operator could continue the drawing action too long thus actually forcing the mandrel from the insert and destroying threads of the insert. There was also no way for the operator to know when the insert was properly secured into the substrate thus the operator could only guess at the proper time to reverse the mandrel to unthread it from the insert. Again, in such tools, the pulling action required movement of the entire drive. This created serious control problems in a hand held tool due to the need to control inertial effects by the operator.

BRIEF DESCRIPTIONS OF THE INVENTION

Figure 1:
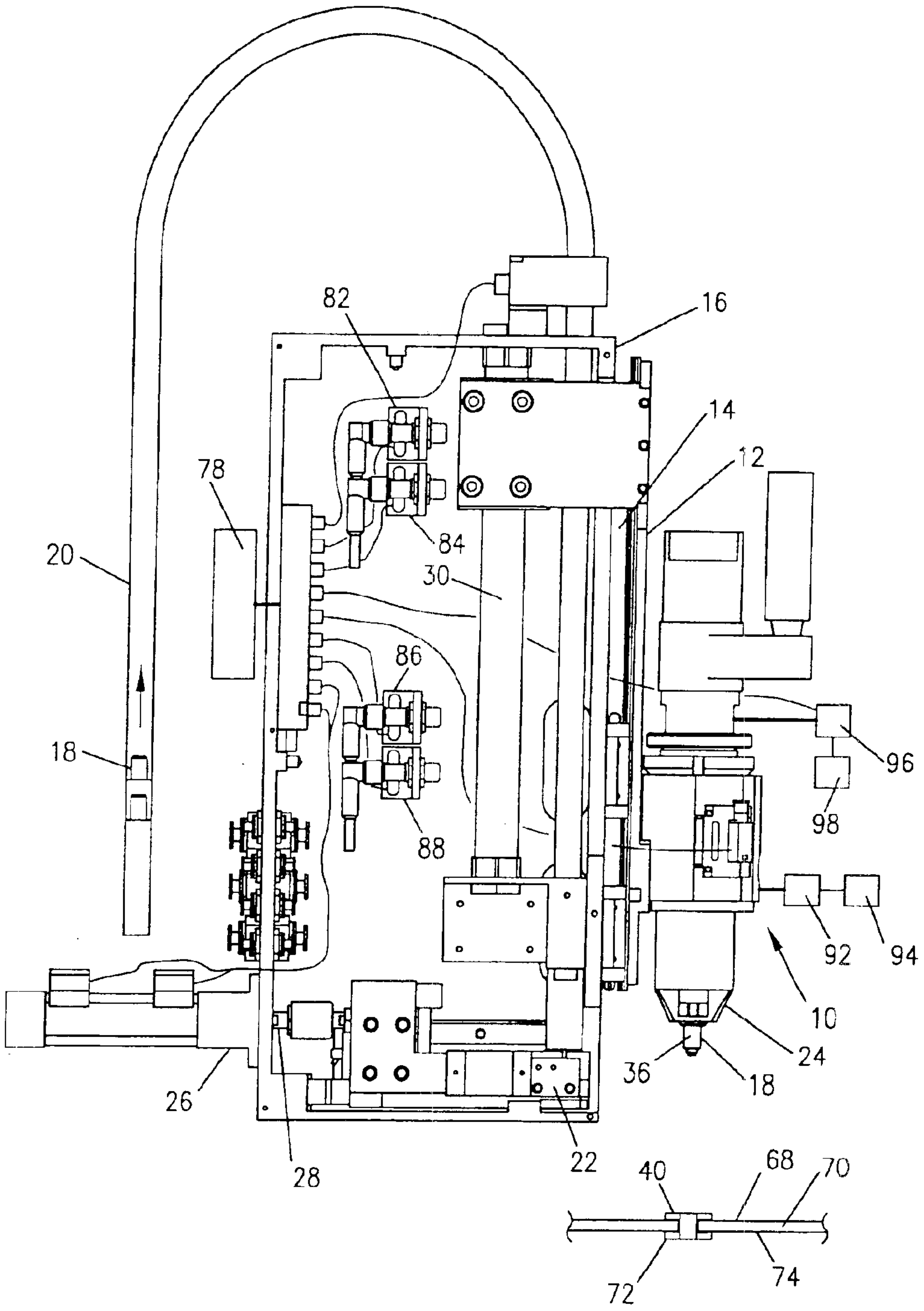
FIG. 1 is an elevational view of an apparatus in accordance with a preferred embodiment of the present invention where the insert gun of the invention is mounted on a frame.
Figure 2:
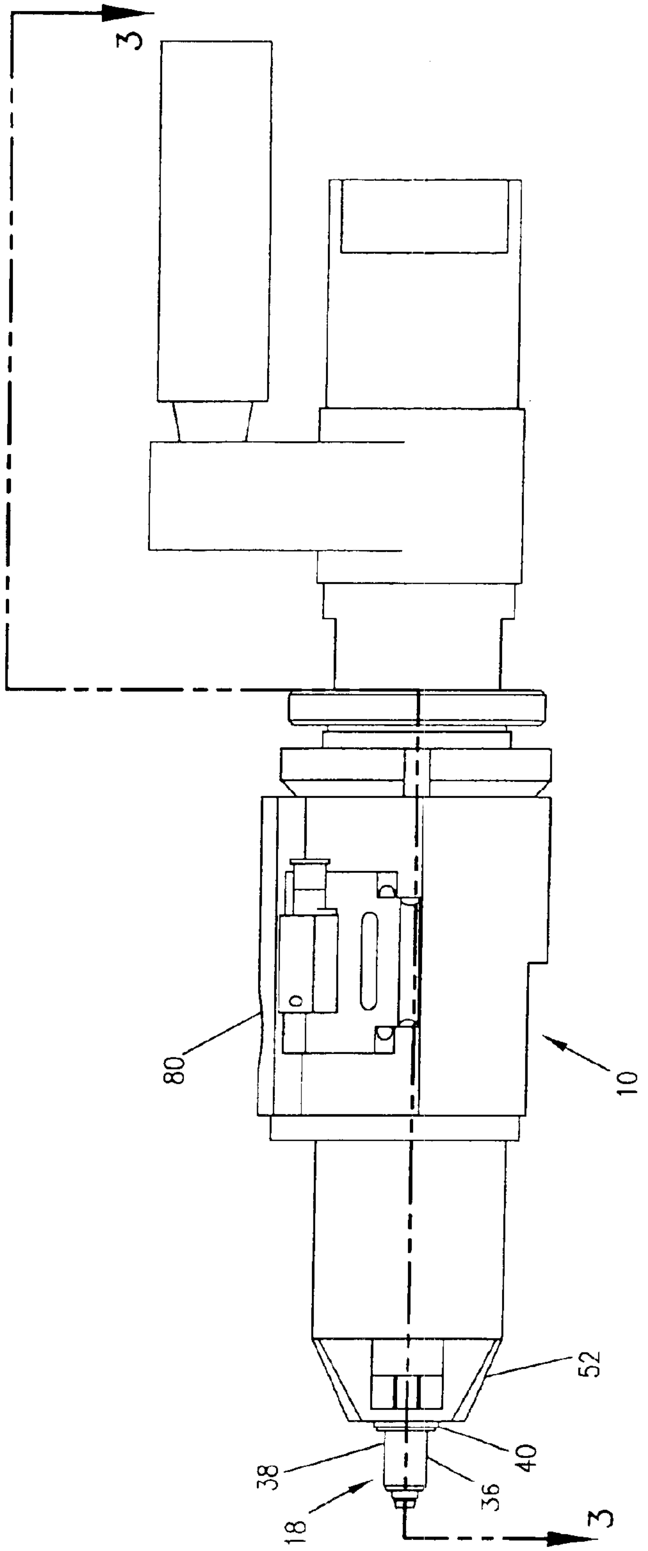
FIG. 2 is a side view of a preferred embodiment of an insert gun of the present invention as shown in FIG. 1.

In accordance with the invention there is therefore provided a method and apparatus that overcome or minimize the disadvantages of the methods and apparatus discussed above in the Background of the Invention. Particularly, the apparatus and method of the invention permit reduced apparatus wear, provide better and more reproducible results, verification of crimp force to collapse the insert to form the grip, confirmation of the collapsed dimension of the insert, and the verification of the presence of proper threads in the installed insert.

As already discussed, the insert to be used in accordance with the invention is a hollow threaded insert for placement into a hole in a substrate where the substrate preferably, but not essentially, has front and rear surfaces. The insert has a shaft with a first end portion, a second end portion and an intermediate portion between the first end portion and second end portion. The insert has a front flange at the first end portion of the shaft for engaging the first (front) surface of the substrate around the hole. The second end portion of the shaft preferably has an internal thread, but may have a male threaded member within a hollow shaft. The intermediate portion includes a gripping means that engages the rear surface of the substrate; or in the case where the shaft of the insert does not pass through the hole, the side walls of the hole; when a force is applied that pulls the second end portion toward the first end portion.

In particular, the method utilizing a frame held apparatus of the invention includes the steps of:

activating a rotatable drive having an attached drive shaft in turn having an attached threaded mandrel so that the threaded portion of the mandrel rotates and threads with the threaded portion of the insert through the flange until a nose retainer, through which the mandrel passes, contacts the flange of the insert;

moving the drive, drive shaft, mandrel and attached insert to place the shaft of the insert into the hole in the substrate so that the flange of the insert contacts the first surface of the substrate;

pulling the second end portion of the shaft of the insert toward the first end portion of the shaft of the insert by means of a pressure applied to a piston within a cylinder where the piston is connected to the drive shaft holding the mandrel so that the motion of the mandrel collapses the intermediate portion of the insert to grip the second (rear surface of the substrate, or the sidewalls of the hole), and so that the drive shaft moves in a compliant coupling toward the drive;

turning the drive in a reverse direction to disengage the mandrel from the threads in the insert; and moving the mandrel, nose retainer, drive shaft and drive in a direction away from the flange of the installed insert.

The method using a preferred embodiment of a hand held spin-pull tool of the invention for installing a hollow threaded insert into a hole in a substrate, having first and second surfaces, includes a number of method steps. It is understood that the insert has a shaft having first and second end portions and a hollow intermediate portion between the first end portion and a second end portion. The insert has a front flange surrounding the first end portion of the shaft for engaging the front surface of the substrate around the hole The second end portion of the shaft has a thread and the intermediate portion has a gripping means that engages the second surface when a force is applied that pulls the second end portion toward the first end portion. The method for using the hand held spin-pull tool of the invention includes the steps of:

- a) placing the shaft of the insert into the hole in the substrate so that the flange of the insert contacts the first surface of the substrate;
- b) closing a switch
- c) activating a rotatable drive in response to the closed switch where the rotatable drive has an attached drive shaft in turn having an attached mandrel so that the mandrel rotates so that threads of the mandrel mate with the threads of the insert until a nose retainer, through which the mandrel passes, contacts the flange of the insert;
- d) detecting when the nose retainer reaches the flange of the insert;
- e) stopping the rotation in response to detecting when the nose retainer reaches the flange of the insert;
- f) applying pressure to a piston within a cylinder where the piston has a central bore retaining the drive shaft that passes through the bore so that the applied pressure move the drive shaft in a slide coupling toward the drive so that the motion of the drive shaft and attached mandrel pulls the second end portion of the insert toward the second surface of the substrate and collapses the intermediate portion of the insert to grip the second surface of the substrate;
- g) detecting when the intermediate portion has collapsed to grip the second surface of the substrate;

h) turning the drive in a reverse direction to disengage the mandrel from the threads of the insert in response to sensing when the intermediate portion has collapsed to grip the second surface of the substrate; and, i) controlling steps c), e), f) and h) by a controller having a programmed logic chip in response to data received by closing of the switch in step b) and in response to data obtained in detecting steps d) and g).

Steps a) through h) are sequential except that step a) may be before step b) or step a) may be between steps d) and e) or between steps e) and f).

The frame held apparatus for installing a hollow threaded inset through a hole in a substrate includes a piston, a drive shaft, a cylinder, an externally threaded mandrel having threads that match the internal threads of the insert, a compliant coupling, a rotatable drive, and a nose retainer.

Structure is provided for moving the piston, drive shaft, cylinder, mandrel, compliant coupling, rotatable drive and nose retainer toward the flange of the insert so that the threads of the mandrel contact the threads of the insert and for moving the threads of the mandrel into the hollow portion of the insert through the flange so that the threads of the mandrel rotate into the threads within the hollow portion of the insert until the flange of the insert contacts the nose retainer. The structure for moving and rotating includes the drive shaft connected to the mandrel where the drive shaft is set into the compliant coupling to the rotatable drive.

Apparatus is provided for moving the mandrel with attached insert to place the insert shaft into a hole in the substrate so that the flange of the insert contacts the first (front) surface of the substrate and for pulling the second end portion of the insert toward the second (rear surface or hole sidewalls) surface of the substrate by applying pressure to the piston within the cylinder where the piston is connected to the drive shaft so that the intermediate portion of the insert collapses to grip the second surface of the substrate and so that the drive shaft moves in the coupling toward the drive without moving the drive.

The drive is any suitable rotating drive, e.g. an electric or air motor that can be run in a reverse direction to disengage the screw head from the threads in the insert. Structure is also provided for moving the piston, drive shaft, cylinder, mandrel, slide coupling, rotatable drive and nose retainer away from the flange of the installed insert.

The hand held spin-pull tool of the invention for securing a hollow threaded insert in a hole in the substrate is very similar to the frame mounted apparatus except that the hand held apparatus (at least the components of a cylinder, piston, drive, drive shaft, mandrel, variable coupling, and nose retainer taken together) is manually moved relative to the insert and workpiece (substrate). Except for relative motion of initially activating switch components, relative motion of components within the tool is automatic after initial activation.

The hand held tool of the invention has at least the following components:

a) a switch activated (closed) by manual movement, which may be any suitable initially activating switch such as a trigger switch or a travel activated switch that closes when the nose retainer is pushed against the flange of the insert when the flange is in contact with the first surface of the substrate. Such a travel activated switch may also be referred to as a push to start switch;

b) a rotatable drive activatable in response to the closed switch where the rotatable drive has an attached drive shaft in turn having an attached threaded mandrel so that upon activation of the drive, the mandrel rotates so that threads of the mandrel mate with the threads of the insert until a nose retainer, through which the mandrel passes, contacts the flange of the insert;

c) a nose retainer position detector for detecting when the nose retainer reaches the flange of the insert;

d) a controller for stopping the rotation in response to detecting when the nose retainer reaches the flange of the insert;

e) a cylinder and piston where the piston has a central bore retaining the drive shaft that passes through the bore;

f) a slide coupling connecting the drive shaft with the drive;

g) a hydraulic system for applying pressure to the piston so that the applied pressure linearly moves the drive shaft in the slide coupling toward the drive so that the motion of the drive shaft and attached mandrel pulls the second end portion of the insert toward the second surface of the substrate and collapses the intermediate portion of the insert to grip the second surface of the substrate;

h) a controller for activating and controlling the hydraulic system for applying pressure to the piston in response to detecting when the nose retainer reaches the flange of the insert;

i) an insert collapse detector for detecting when the intermediate portion has collapsed to grip the second surface of the substrate;

j) a controller for disengaging the hydraulic system and for turning the drive in a reverse direction to disengage the mandrel from the threads of the insert in response to sensing when the intermediate portion has collapsed to grip the second surface of the substrate.

The controllers for stopping the rotation, for activating and controlling the hydraulic system, for disengaging the hydraulic system and for turning the drive in a reverse direction are preferably all the same controller having a programmed logic chip operating in response to data received from closing of the switch activated by manual movement, from the nose retainer position detector, and from the insert collapse detector. The insert collapse detector may operate by detecting any parameter indicating that the intermediate portion of the insert has properly collapsed. The insert collapse detector may for example detect an increase in pulling force when the intermediate portion has collapsed sufficiently to grip the second surface of the substrate or may detect travel distance of the second end portion relative to the second end portion of the insert that corresponds to the relative travel after the intermediate portion has collapsed sufficiently to grip the second surface of the substrate.

As previously discussed, the initially activating switch may be a hand trigger switch or a travel activated switch that closes when the nose retainer is pushed against the flange when the flange is in contact with the first surface of the substrate.

The apparatus (tool) of the invention may operate where the first and second surfaces of the substrate are parallel surfaces and the hole holding the insert passes through the surfaces and the intermediate portion of the insert passes through the hole. The hole may also be a blind hole where the first surface is a surface perpendicular to a longitudinal axis of the hollow shaft in contact with the front flange and the second surface is an inside surface surrounding the blind hole. In such a case, the intermediate portion of the insert collapses to provide lateral pressure against the inside surface surrounding the hole (second surface).

The hydraulic system for applying pressure to the piston so that the applied pressure linearly moves the drive shaft is usually an air compressor having a gas valve activatable by the controller. The hydraulic system is usually connected to the tool by a hose carrying pressurized hydraulic fluid.

The mandrel may have a male thread for engagement with a female thread of the insert or may have a female thread for engaging a male thread inside the insert to form a stud when the second end is pulled toward the tool to collapse the intermediate portion.

DETAILED DESCRIPTION OF THE INVENTION

The inserts for use in accordance with the present invention are as previously described. Such inserts are usually made from a metallic material, e.g. aluminum, steel, copper, or bronze, but may be made from certain plastics that are both flexible and rigid enough to form a permanent grip when the second end of the insert is drawn toward the second surface of the substrate, and strong enough to maintain threads that can withstand the torque and retaining ability required for a particular application. The firs end of the insert frequently has a length about equal to the thickness of the substrate or slightly less. The intermediate portion of the insert shaft, that forms the grip, usually begins at about the rear surface of the substrate and extends to the threads at the second end when the shaft of the insert passes through the substrate.

As already discussed, the substrate may be made of many types of materials and is usually of a thickness of from about 0.5 mm to about 15 cm. The thickness of the substrate is most commonly from about 1 mm to about 10 mm. It is nevertheless to be understood that the invention is not necessarily limited by substrate thickness.

In either the frame mounted or hand held apparatus, the rotatable drive is usually a hydraulically operated motor, e.g. a pneumatic air motor, but may be any suitable source for application of a rotational force, e.g. an electric motor.

The drive shaft is usually a steel rod that may be provided with bosses or shoulders for seals or retention. A first end of the drive shaft is adapted to be fitted to a variable coupling, as described infra, and the second end of the drive shaft is usually formed to accept a threaded mandrel so that the mandrel, which is a wear part, can be quickly replaced without disassembly of the apparatus of the invention to remove the drive shaft.

An important aspect of the present invention is the variable (or compliant) coupling that permits the first end of the drive shaft to be connected to the spindle of the drive while at the same time allowing the drive shaft to move toward and away from the drive without causing drive movement. Such a coupling also allows for at least some misalignment of the spindle and drive shaft without creating significant wear. Examples of such variable or compliant couplings are slide couplings and spring loaded couplings.

The apparatus for pulling the second end of the shaft of the insert includes a piston within a cylinder. The piston is biased toward the nose of the insert gun, e.g. with a spring. When the piston is forced in a direction away from the insert, e.g. by application of pressurized hydraulic fluid to the face of the piston sealed within a cylinder, the piston engages the drive shaft, that passes through the piston, and forces the drive shaft away from the insert thus pulling the second end of the insert shaft toward the rear surface of the substrate to cause the intermediate portion of the shaft to form a grip against the rear surface of the substrate. "Hydraulic", as used herein means the use of pressurized fluid to move a piston. The fluid may be either a liquid, e.g. an oil or a gas, e.g. air.

In the frame mounted embodiment, the entire gun assembly, i.e. cylinder, piston, drive, drive shaft, mandrel, variable coupling, and nose retainer, is moved in a slide on a frame using hydraulic, e.g. pneumatic, cylinders connected between the frame and a bracket holding the gun.

In the hand held tool, movement of the tool to the insert and substrate and initial switch activation is accomplished manually, but drive rotations and pulling sequences then are essentially automatic.

The invention may be better understood by reference to the drawings that show a preferred embodiment of the invention.

As seen in FIG. 1, insert gun 10 is mounted on bracket 12 that operates within a slide 14 on a frame 16. In operation inserts 18 are forced through a blow tube 20 to an oriented position in an insert gripper 22. The gripper 22 is then moved to a position beneath nose 24 by hydraulic cylinder 26 having its piston 28 interconnected to gripper 22, so that the mandrel can be lowered to engage the threads of an insert 18. The lowering of gun 10 is accomplished by hydraulic cylinder 30 connected between bracket 12 and frame 16.

Figure 3:
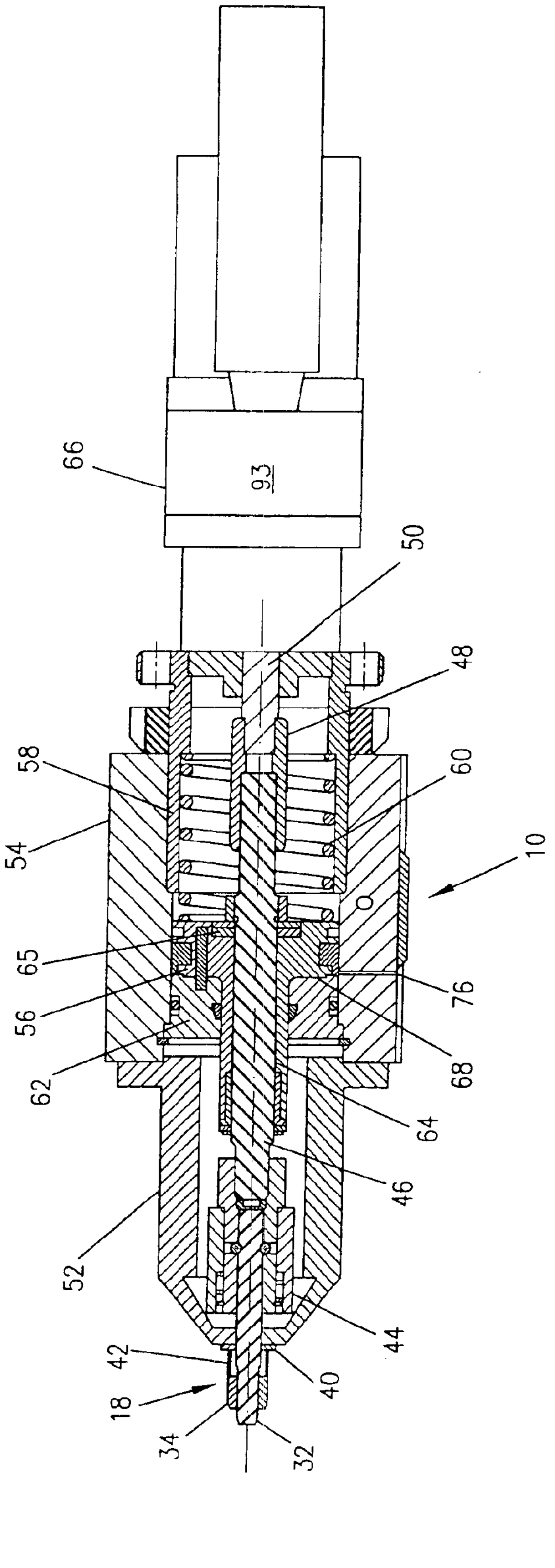
FIG. 3 is a cross sectional view of the gun of FIG. 2 taken on line 3—3 of FIG. 2.
Figure 4:
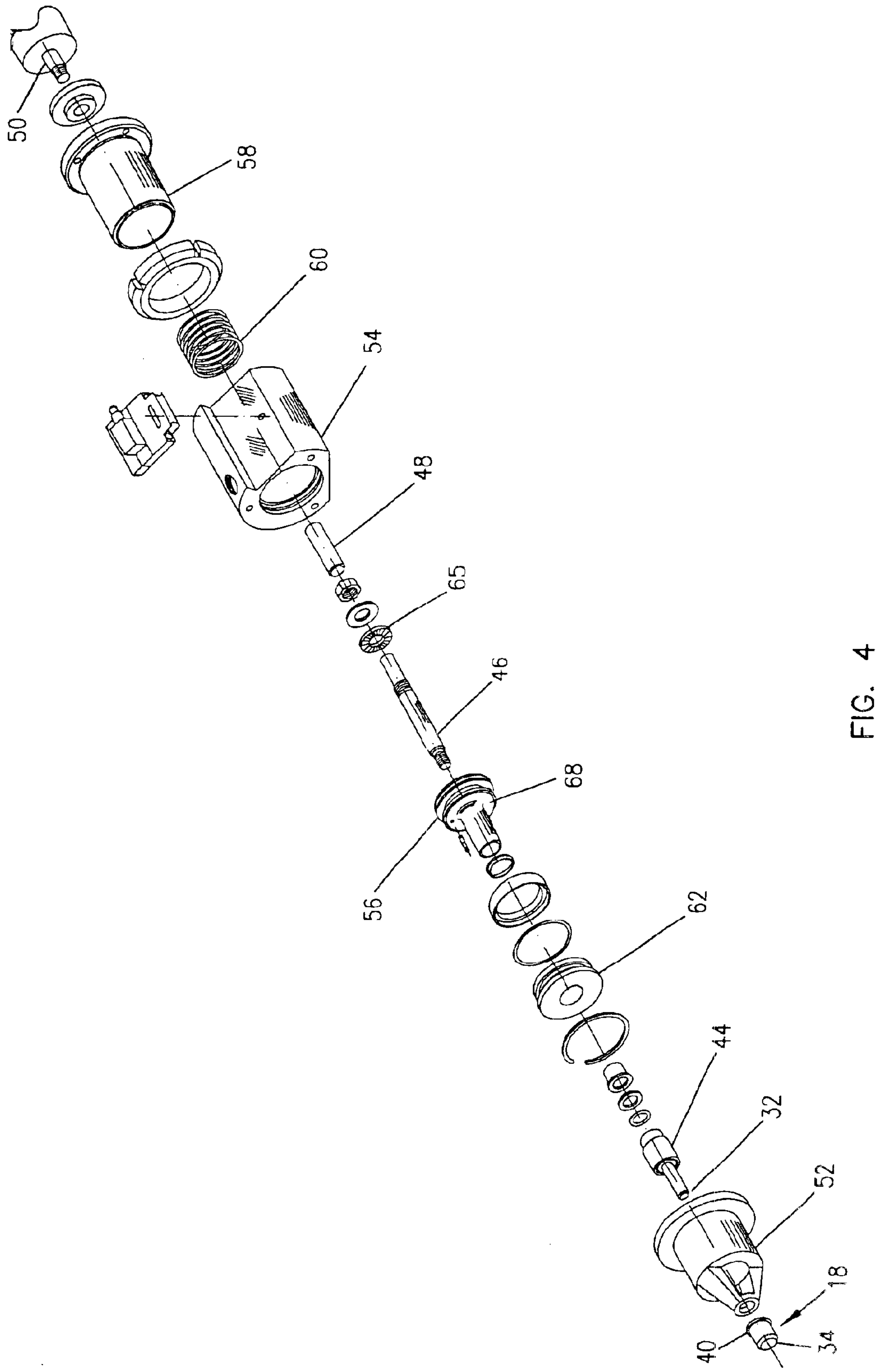
FIG. 4 is an exploded isometric view of the gun of FIG. 3.

The gun 10, whose component parts are best seen in FIGS. 3 and 4, includes a screw head (mandrel) 32 adapted to screw into the threaded second end 34 of the shaft 36 of the insert 18. Insert 18 further has a first end 38 surrounded by a flange 40 and has intermediate collapsible portion 42.

Mandrel 32 is readily replaceable and is held by chuck 44 attached to drive shaft 46. Drive shaft 46 is in turn connected to slide coupling 48 that is connected to drive spindle 50. Mandrel 32 is stabilized by nose 52 which also acts as a retainer against insert flange 40 when second end 34 is being pulled toward flange 40.

Gun 10 is further provided with a cylinder 54 and a piston 56 contained within the cylinder 54. Cylinder 54 includes spring retainer sleeve 58 for holding a spring 60 that biases piston 56 toward a cylinder front end cap 62. Piston 56 is provided with a through bore 64 permitting passage of shaft 46. Shaft 46 is free to rotate within bore 64 but is keyed to piston 56 so that longitudinal movement of piston 56 also longitudinally moves shaft 46. Preferably a thrust bearing 65 is provided to reduce friction with piston 56 when shaft 46 is rotated with respect to piston 56. This is especially true when a longitudinal force, e.g. the weight of drive 66, is applied to shaft 46 that increases friction with piston 56.

A drive 66 is provided that rotates spindle 50 when the drive is activated. Drive 66 is preferably an air motor operated by means of valve 96 controlling flow from air supply 98 but may also be another type of rotating drive such as an electric motor. The drive is securely attached to cylinder 54 by threading the front of drive housing 93 into sleeve 58. The housing of drive 66 does not move relative to cylinder 54. The slide coupling 48 permits longitudinal movement of drive shaft 46 relative to spindle 50 so that there is also no longitudinal movement of spindle 50 relative to cylinder 54 even when shaft 46 itself move longitudinally with respect to cylinder 54.

As previously discussed piston 56 has a central bore 64, and also has piston front surface 68 facing the screw head 32. The drive shaft 46 passes through and is retained by central bore 64 so that longitudinal movement of the piston 56 moves drive shaft 46 while permitting drive shaft 46 to rotate within bore 64.

Cylinder 54 housing piston 56 is rigidly connected to the drive 66 and slidably connected to frame 16 by slide 14 so that cylinder 54 can slide relative to frame 16 but cannot rotate relative frame 16.

The nose 52 is rigidly connected to cylinder 54. Nose 52 engages flange 40 of insert 18 to hold it against first surface 68 of substrate 70 when the second end of the insert shaft is pulled toward the first end of the insert shaft to form a grip 72 against second surface 74 of substrate 70.

A fluid inlet including port 76 in cylinder 54 is provided for permitting fluid under pressure to enter cylinder 54 and contact the front face 68 of piston 56 to push piston 56 and retained drive shaft 46 in a direction toward drive 66 and to cause drive shaft 46 to slide within coupling 48.

A fluid outlet is also provided to permit fluid to be released from cylinder 54 which may use the same port 76 as the fluid inlet. The direction of flow through port 76 is controlled by an external valve.

A control 78 is provided for controlling the operation of the apparatus in response to input from sensors 80, 82, 84, 86 and 88 forming part of control 78. Control 78 activates drive 66 for causing screw head 32 to screw into threaded portion 34 of insert 18. Control 78 then stops drive 18 and causes cylinder 54 to move in slide 14 relative to frame 16 along with gun 10 and the insert 18 held on the screw head 32 to insert the shaft 36 of the insert into the hole in substrate 70. The control 78 closes valve 92 permitting outlet from port 76 and causes fluid under pressure from reservoir 94 to enter cylinder 54 through port 76 to force screw head 32 attached to drive shaft 46 by coupling 44 toward drive 66 to cause the grip 72 of the insert 18 to engage second surface 74 of substrate 70. Control 78 stops fluid inlet into cylinder 54 and opens the outlet to relieve pressure in cylinder 54. Control 78 then causes drive 66 to activate in reverse to unscrew screw head 32 from now installed insert 18. Unscrewing from the insert verifies that the threads in the insert are undamaged. Control 78 then caused gun 10 to move relative to the frame in a direction away from the installed insert.

The sensors of the control 78 includes a piston position sensor 80 that may be a magnet moving with the piston and a magnetic field detector attached to the cylinder or may be a feeler switch. Other sensors are: sensor 82 for detecting when cylinder 54 is positioned relative to the frame in a position where gun 10 (attached to bracket 12 by cylinder 54) is withdrawn to permit positioning of an insert for loading onto screw head 32; sensor 84 for detecting where the screw head 32 is screwed into the insert so that nose retainer 52 contacts flange 40 of the insert; sensor 88 for detecting where the shaft 18 of the insert is inserted into substrate 70 so that insert flange 40 contacts the first surface 68 of substrate 70 and sensor 86 for detecting where the screw head 32 has been unscrewed from the insert. Control 78 handles signals from the sensors and provides commands to operate pistons, inlet and outlet valve 90 and drive 66 using a programmed logic chip within control 78.

Figure 5:
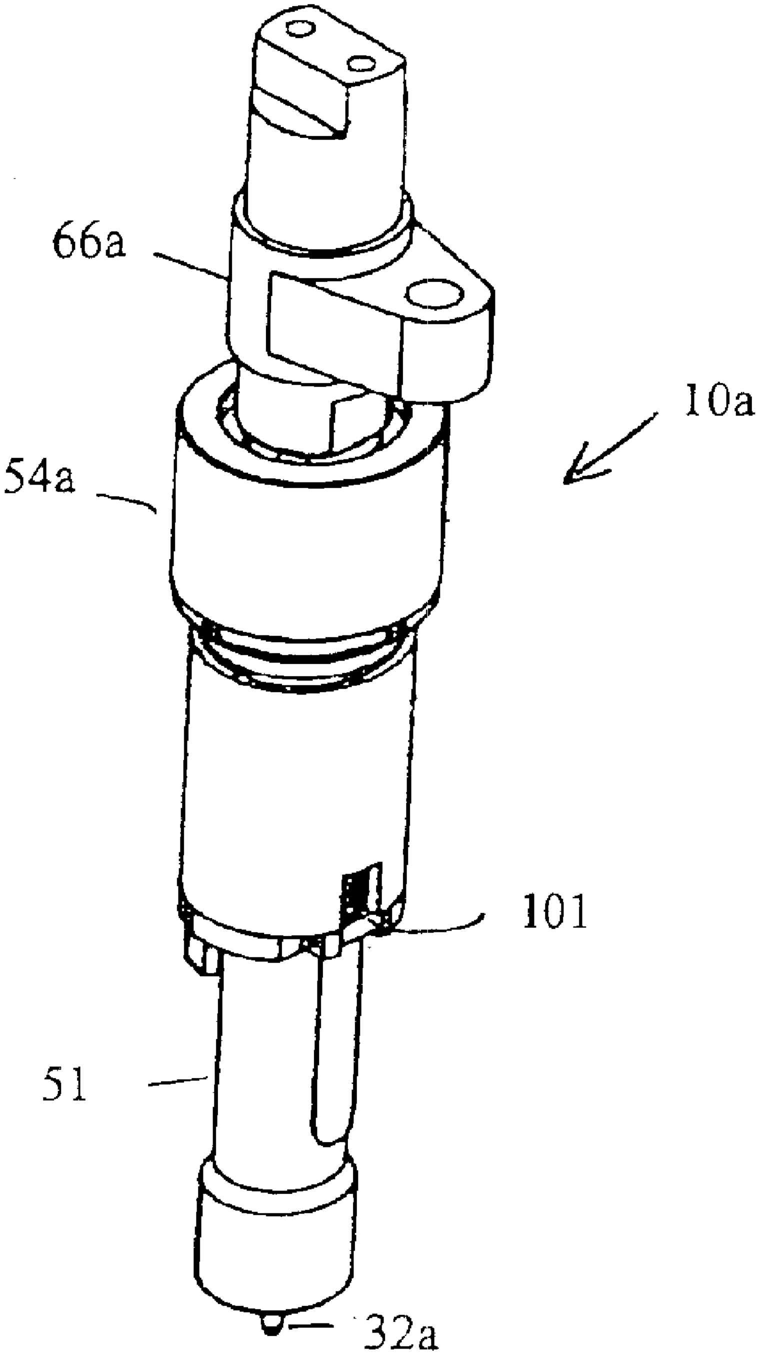
FIG. 5 shows a perspective view of a preferred embodiment of a hand held spin-pull tool of the invention for installing inserts into a substrate, less retaining handles.
Figure 6:
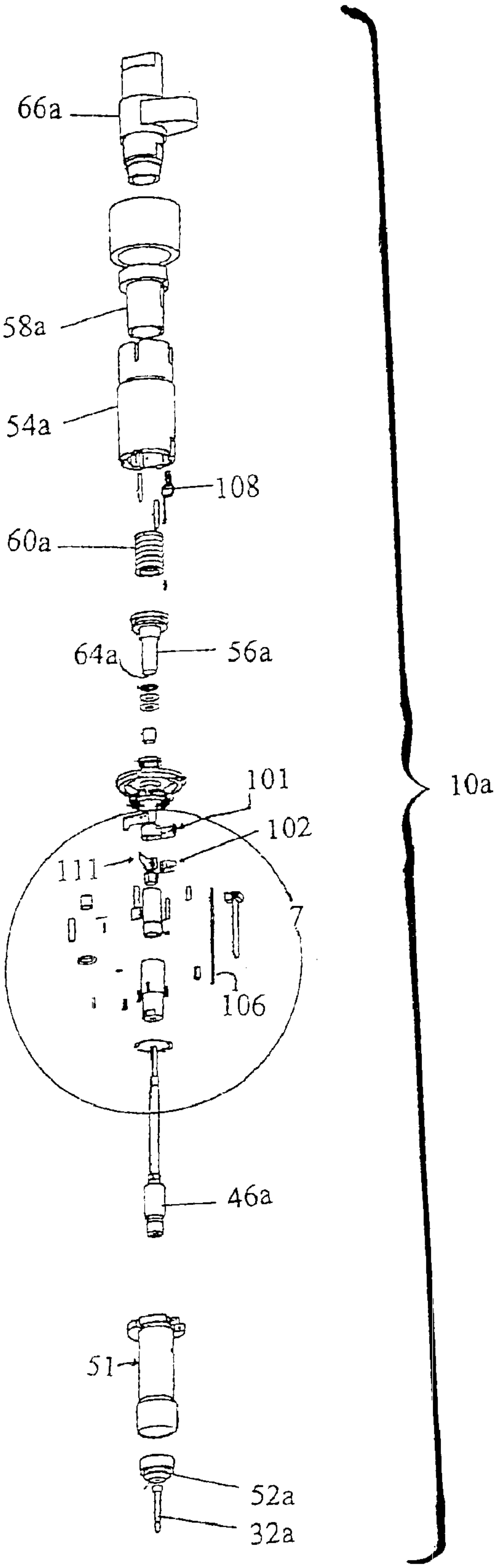
FIG. 6 shows an exploded assembly drawing of a preferred embodiment of a hand held spin-pull tool of the invention.
Figure 7:
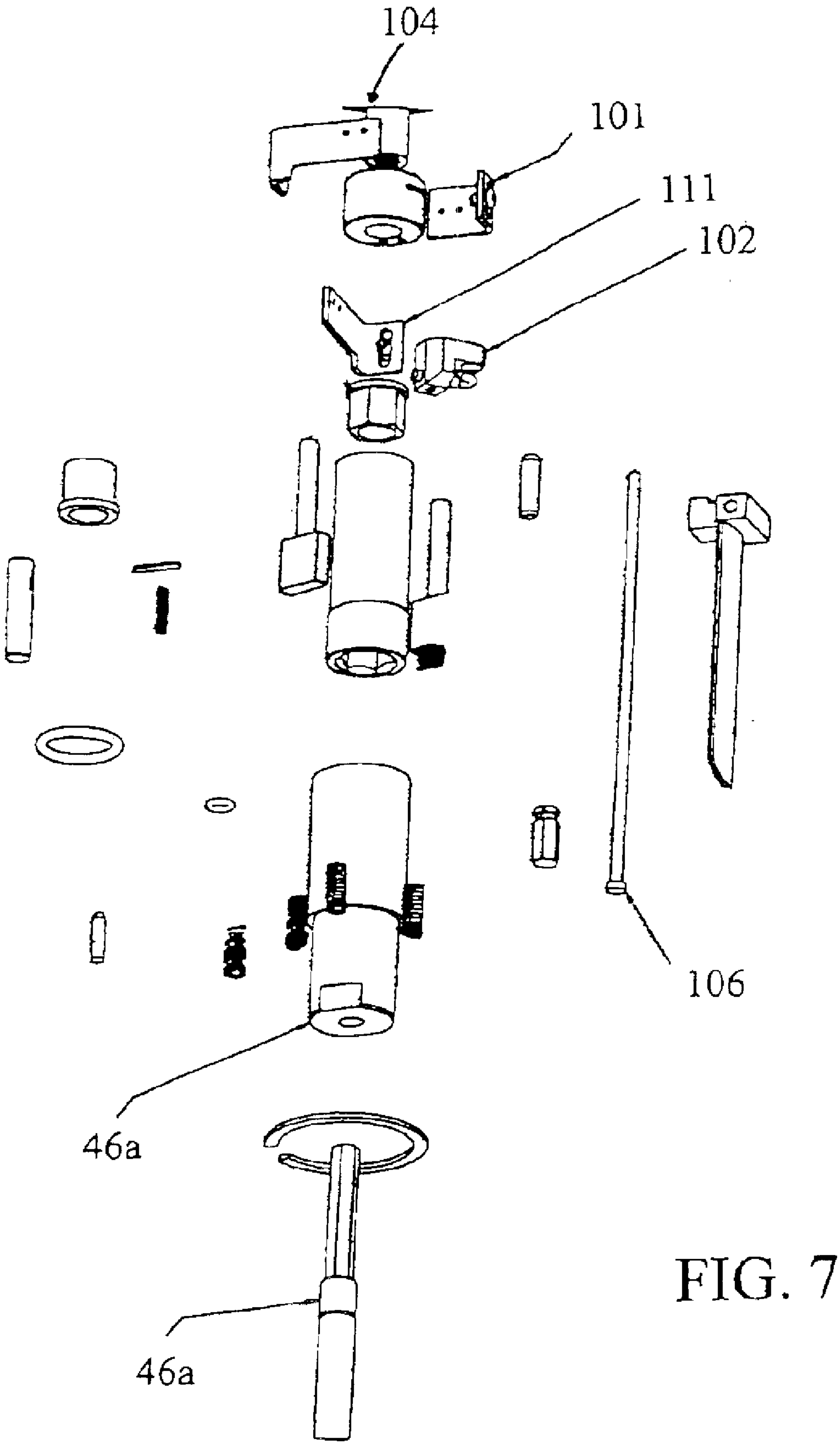
FIG. 7 shows a magnified view of section B of FIG. 2.
Figure 8:
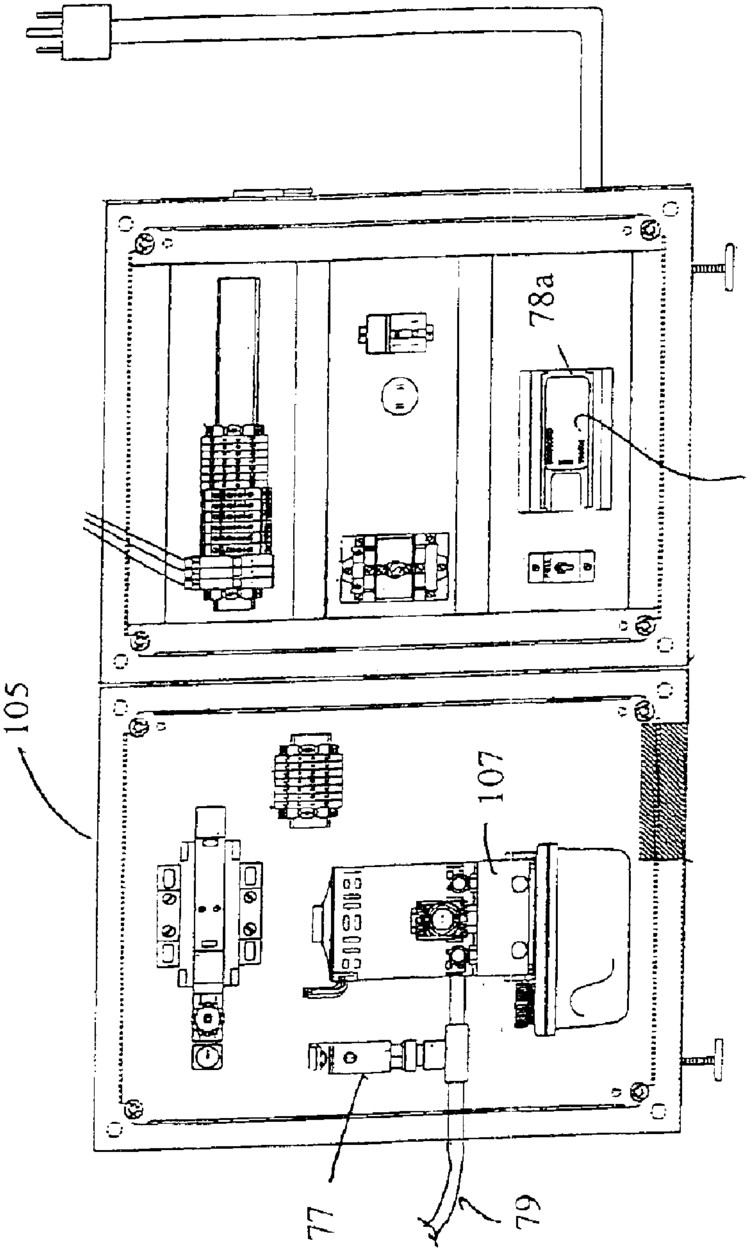
FIG. 8 shows a front elevation of an open controller board box for a preferred embodiment of a hand held spin-pull tool of the invention.
Figure 9:
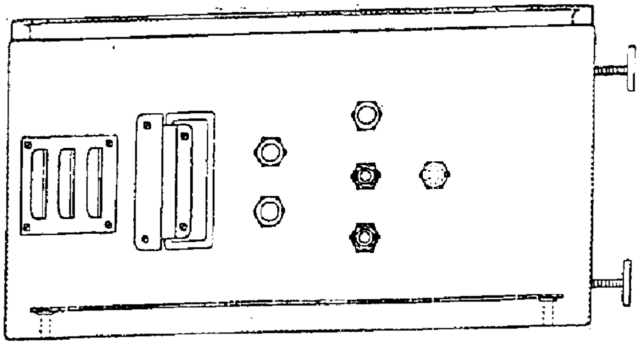
FIG. 9 shows an end view of the box of FIG. 8.

As seen in FIGS. 5 and 6, a preferred embodiment of hand held spin-pull tool of the invention **10*a* is provided for securing a hollow threaded insert 18 in a hole in a substrate 70. As previously discussed, the substrate has first and second surfaces 68 and 74. The insert 18 has a hollow shaft 36 having a first end portion 38, a second end portion 34 and an intermediate portion 42 between the first end portion 38 and the second end portion 34. The insert 18 is placed in the hole and has a front flange 40 surrounding the first end portion 38 of the shaft 36 for engaging the first surface 68 of the substrate 70 around the hole. The second end portion 34 of the shaft 36 has a thread 34*a*, and said intermediate portion 42 has a grip 72 that engages the second surface 74 when a force is applied that pulls the second end portion 34 toward the first end portion 38**.

The hand tool **10*a* has at least one sequence initiation switch activated by manual movement. Such a switch may, for example, be a trigger switch 101 or a push to start 102 switch as described herein. In particular, the switch may be a hand trigger switch 101 operated by finger pressure or, more preferably a travel activated switch 102 that closes when the nose retainer 52*a* is pushed by manual force against the flange 40 when the flange 40 is in contact with the first surface 68** of the substrate.

The hand held tool has a rotatable drive **66*a* activatable in response to a closed manual switch. The rotatable drive 66*a* has an attached drive shaft 46*a* passing through a barrel 51. Drive shaft 42*a* in turn has an attached threaded mandrel 32*a* so that upon activation of the drive 66*a*, the mandrel 32*a* rotates so that threads of the mandrel 32*a* mate with threads of the insert 18 until a nose retainer 52*a*, through which the mandrel 32*a* passes, contacts the flange 40** of the insert.

A detector is provided for detecting when the nose retainer **52*a* reaches the flange 40 of insert 18. The detector is preferably a microswitch 104 located in a cylinder body 54*a* that detects when the insert has been threaded onto the mandrel 32*a* by means of movement of a part present pin 106 that moves to push on switch 104 when the part present pin 106 contacts the flange 40 of the insert. Upon activation of switch 104, rotation of the drive 66*a* is stopped by controller 78*a* within a control box 105 that may be a part of or tethered to tool 10*a*** by an electrical conduit.

The tool has a cylinder **54*a* and piston 56*a* that has a central bore 64*a* retaining a drive shaft 46*a* that passes through the bore 64*a*. Like the frame mounted apparatus, cylinder 54*a* is provided with a spring retainer sleeve and cap 58*a* for holding a spring 60*a* that biases piston 56*a* toward a front of the cylinder 54*a*. A slide coupling 48*a* connects drive shaft 46*a* to a spindle of drive 66*a***.

In the preferred embodiment a hydraulic system 107 within box 105 is provided for applying pressure to the piston **56*a* so that the applied pressure longitudinally moves the drive shaft 46*a* in the slide coupling 48*a* toward the drive 66*a* so that the motion of the drive shaft 46*a* and attached mandrel 32*a* pulls the second end portion 34 of the insert 18 toward the second surface 74 of the substrate 70 and collapses the intermediate portion 42 of the insert 18 to grip the second surface 74 of the substrate 70. The hydraulic system is preferably a pneumatic system including an air compressor having a gas valve 77 activatable by the controller 78*a*. The hydraulic system transfers pressurized fluid to the tool in a hose 79** connected to the tool.

The tool is provided with a detector 108 for detecting when the intermediate portion 42 has collapsed to grip the second surface 74 of the substrate. The detector 108 may be a pressure switch to detect an increase in pulling force when the intermediate portion 42 has collapsed sufficiently to grip the second surface of the substrate thus indicating completion of the collapse to form a tight grip or the detector 108 may detect travel distance of the second end portion 34 relative to the first end portion 38 of the insert 18 that corresponds to the relative travel after the intermediate portion 42 has collapsed sufficiently to grip the second surface of the substrate.

Upon detection of collapse to form the grip and signaling the controller **78*a*, the controller opens a valve to release hydraulic pressure against the piston 56*a* and the piston 56*a* returns to its resting position due to the bias of spring 60*a***.

The controller then also signals the drive to reverse thus withdrawing the threaded mandrel from the insert 18 thus confirming the presence of insert threads.

The controller 78*a* for controlling the rotatable drive 66*a*, and hydraulic pressure on the piston 56*a* includes a programmed logic chip operating in response to data received by closing of the manual switch and in response to data obtained by detectors 102 and 108.

For purposes of safety and control a reverse switch 111 is provided for reversing the motor to withdraw the mandrel in case of a jam. All sequences can be manually stopped by repeated pushing of start switch 101.

What is claimed is:

1. A method for installing a hollow threaded insert into a hole in a substrate having first and second surfaces where the insert has a hollow shaft having first and second end portions and an intermediate portion between the first end portion and the second end portion, the insert having a front flange surrounding the first end portion of the shaft for engaging the front surface of the substrate around the hole, the second end portion of the shaft having a thread, and said intermediate portion comprising a gripping means that engages the second surface when a force is applied that pulls the second end portion toward the first end portion; said method comprising:

a) placing the shaft of the insert into the hole in the substrate so that the flange of the insert contacts the first surface of the substrate;

b) closing a manually operated switch c) activating a rotatable drive in response to the closed switch where the rotatable d rive has an attached drive shaft in turn having an attached mandrel so that the mandrel rotates so that threads of the mandrel mate with the threads of the insert until a nose retainer, through which the mandrel passes, contacts the flange of the insert;

d) detecting when the nose retainer reaches the flange of the insert;

e) stopping the rotation in response to detecting when the nose retainer reaches the flange of the insert;

f) applying pressure to a piston within a cylinder where the piston has a central bore retaining the drive shaft that passes through the bore so that the applied pressure moves the drive shaft in a slide coupling toward the drive so that the motion of the drive shaft and attached mandrel pulls the second end portion of the insert toward the second surface of the substrate and collapses the intermediate portion of the insert to grip the second surface of the substrate;

g) detecting when the intermediate portion has collapsed to grip the second surface of the substrate;

h) turning the drive in a reverse direction to disengage the mandrel from the threads of the insert in response to sensing when the intermediate portion has collapsed to grip the second surface of the substrate; and, i) controlling steps c), e), f) and h) by means of a controller comprising a programmed logic chip in response to data received by closing of the switch in step b) and in response to data obtained in detecting steps d) and g);

provided that, steps a) through h) are sequential except that step a) may be before step b) or step a) may be between steps e) and f).

2. The method of claim 1 wherein detecting when the intermediate portion has collapsed to grip the second surface of the substrate is accomplished by detecting an increase in pulling force when the intermediate portion has collapsed sufficiently to grip the second surface of the substrate.

3. The method of claim 1 wherein detecting when the intermediate portion has collapsed to grip the second surface of the substrate is accomplished by detecting the travel distance of the second end portion of the insert relative to the first end portion of the insert that corresponds to the relative travel after the intermediate portion has collapsed sufficiently to grip the second surface of the substrate.

4. The method of claim 1 where the manually operated switch is a hand trigger switch.

5. The method of claim 1 where the manually operated switch is a travel activated switch that closes when the nose retainer is pushed against the flange when the flange is in contact with the first surface of the substrate.

6. The method of claim 1 where the manually operated switch is activated by engaging the insert with the mandrel closing a push to start switch.

7. The method of claim 1 where the first and second surfaces are parallel surfaces, the hole passes through the surfaces and the intermediate portion of the insert passes through the hole.

8. The method of claim 1 where the hole is a blind hole, the first surface is a surface perpendicular to a longitudinal axis of the hollow shaft in contact with the front flange and the second surface is an inside surface surrounding the blind hole.

9. A hand held spin-pull tool for securing a hollow threaded insert in a hole in a substrate having first and second surfaces where the insert has a hollow shaft having a first end portion, a second end portion and an intermediate portion between the first end portion and the second end portion, the insert being placed in the hole and having a front flange surrounding the first end portion of the shaft for engaging the first surface of the substrate around the hole, the second end portion of the shaft having a thread, and said intermediate portion comprising a gripping means that engages the second surface when a force is applied that pulls the second end portion toward the first end portion; said tool comprising:

a) a switch activated by manual movement b) a rotatable drive activatable in response to the closed switch where the rotatable drive has an attached drive shaft in turn having an attached threaded mandrel so that upon activation of the drive, the mandrel rotates so that threads of the mandrel mate with the threads of the insert until a nose retainer, through which the mandrel passes, contacts the flange of the insert;

c) means for detecting when the nose retainer reaches the flange of the insert;

d) means for stopping the rotation in response to detecting when the nose retainer reaches the flange of the insert;

e) a cylinder and piston where the piston has a central bore retaining the drive shaft that passes through the bore;

f) a slide coupling connecting the drive shaft with the drive;

g) means for applying pressure to the piston so that the applied pressure moves the drive shaft in the slide coupling toward the drive so that the motion of the drive shaft and attached mandrel pulls the second end portion of the insert toward the second surface of the substrate and collapses the intermediate portion of the insert to grip the second surface of the substrate;

h) means for detecting when the intermediate portion has collapsed to grip the second surface of the substrate;

i) means for turning the drive in a reverse direction to disengage the mandrel from the threads of the insert in response to sensing when the intermediate portion has collapsed to grip the second surface of the substrate; and, j) a controller for controlling the rotatable drive and the means for applying pressure, said controller comprising a programmed logic chip operating in response to data received by closing of the switch in step a) and in response to data obtained by the detecting means of paragraphs c) and h).

10. The tool of claim 9 where the manually operated switch is a hand trigger switch.

11. The tool of claim 9 where the manually operated switch is activated by engaging the insert with the mandrel closing a push to start switch.

12. The tool of claim 9 where the manually operated switch is a travel activated switch that closes when the nose retainer is pushed against the flange when the flange is in contact with the first surface of the substrate.

13. The tool of claim 9 wherein the means for detecting when the intermediate portion has collapsed to grip the second surface of the substrate is accomplished by means for detecting an increase in pulling force when the intermediate portion has collapsed sufficiently to grip the second surface of the substrate.

14. The tool of claim 9 wherein the means for detecting when the intermediate portion has collapsed to grip the second surface of the substrate is accomplished by means for detecting the travel distance of the second end portion of the insert relative to the first end portion of the insert that corresponds to the relative travel after the intermediate portion has collapsed sufficiently to grip the second surface of the substrate.

15. The tool of claim 9 where the switch is a hand trigger switch.

16. The tool of claim 9 where the switch is a travel activated switch that closes when the nose retainer is pushed against the flange when the flange is in contact with the first surface of the substrate.

17. The tool of claim 9 where the first and second surfaces are parallel surfaces, the hole passes through the surfaces and the intermediate portion of the insert passes through the hole.

18. The tool of claim 9 where the hole is a blind hole, the first surface is a surface perpendicular to a longitudinal axis of the hollow shaft in contact with the front flange and the second surface is an inside surface surrounding the blind hole.

19. The tool of claim 9 where the means for applying pressure to the cylinder is a hydraulic power supply having a hydraulic valve activatable by the controller connected to the tool by a hose.

20. The tool of claim 19 where the hydraulic power supply comprises an air compressor having a gas valve activatable by the controller connected to the tool by a hose.

21. The tool of claim 9 where the mandrel has a male thread for engagement with a female thread of the insert.

22. The tool of claim 9 where the drive is an air motor coupled to a gas valve connected between a pressurized gas supply and the tool by a hose, which valve is activatable by the controller.

23. The tool of claim 9 where the controller is connected to the manually held portion of the tool by an electrical cable.

* * * * *